United States Patent Office 3,458,505
Patented July 29, 1969

3,458,505
BICYCLO[2.2.2]OCTANE AND OCT-2-ENE-1-CAR-
BOXYLATES OF SELECTED 17β-HYDROXY
STEROIDS FUSED TO A HETEROCYCLIC
RING
Richard M. Scribner, Crestfield, Wilmington, Del., assignor to E. I. du Pont de Nemours and Company, Wilmington, Del., a corporation of Delaware
No Drawing. Filed Feb. 17, 1967, Ser. No. 616,778
Int. Cl. C07c *173/10, 173/00, 169/24*
U.S. Cl. 260—239.5                                7 Claims

ABSTRACT OF THE DISCLOSURE

Esters of unsubstituted or 4-(lower alkyl)substituted bicyclo[2.2.2]octane-1 and bicyclo[2.2.2]oct-2-ene-1-carboxylic acids and 17β-hydroxyandrostano[3,2-c]pyrazoles or 17β-hydroxyandrostano[2,3d]isoxazoles. The esters are prepared by reacting the bicyclo ester of a 17β-hydroxy-2(hydroxymethylene)androstane-3-one with either hydrazine or hydroxylamine.

BACKGROUND OF THE INVENTION

Field of the invention

This invention relates to new esters of certain 17β-hydroxy steroids having a heterocyclic ring fused to the A-ring, and to the preparation of these compounds. More specifically, the products of this invention are esters, with unsubstituted or 4-(lower alkyl)substituted bicyclo[2.2.2]-octane-1 and bicyclo[2.2.2]oct-2-ene-1-carboxylic acids, of 17β - hydroxyandrostano[3,2 - c]pyrazoles and 17β - hydroxyandrostano[2,3-d]isoxazoles.

Description of the prior art

The use of steroids in pharmaceutical applications has led to interest in the synthesis of novel steroids. It has been found that some esters of 17-hydroxy steroids have favorable pharmaceutical properties. An ever-increasing amount of research and synthesis has occurred in the steroid area as a result of past discoveries.

SUMMARY OF THE INVENTION

The novel compositions of this invention are the bicyclo[2.2.2]octane-1 or oct-2-ene-1-carboxylic acid esters of 17β-hydroxyandrostano[3,2-c]pyrazoles or 17β-hydroxyandrostano[2,3-d]isoxazoles. The term "androstano" is used for the sake of brevity to include also the related 4-androsteno, 19-norandrostano and 19-nor-4-androsteno structures. Thus, the products of this invention have the formula (1)

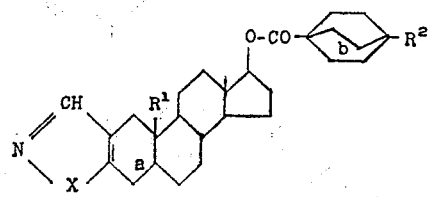

where $R^1$ is hydrogen or methyl; $R^2$ is hydrogen or n-alkyl of 1 to 6 carbons; X is —NH— or —O—; *a* and *b* are single or double bonds, and when *a* is a single bond, the steroid C–5 hydrogen is of the α configuration.

When X is —NH—, the androstanopyrazole is tautomeric with (2)

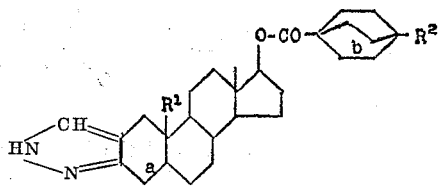

i.e., the androstanopyrazoles are in tautomeric equilibrium and when one formula is written herein, it is understood that both tautomeric forms are included as a part of this invention.

These compounds are prepared by reacting a bicyclo-[2.2.2]octane-1- or bicyclo[2.2.2]oct-2-ene-1-carboxylate of a 17β - hydroxy - 2-hydroxymethyleneandrostane-3-one with either hydrazine, to obtain the pyrazole derivatives, or hydroxylamine, to obtain the isoxazole derivatives. The term "androstane" is used here for brevity to include also the 4-androstene, 19-norandrostane and 19-nor-4-androstene nuclei. This reaction is represented by the following equations, in which the symbols $R^1$, $R^2$, $a$ and $b$ have the previously defined meanings:

(I)

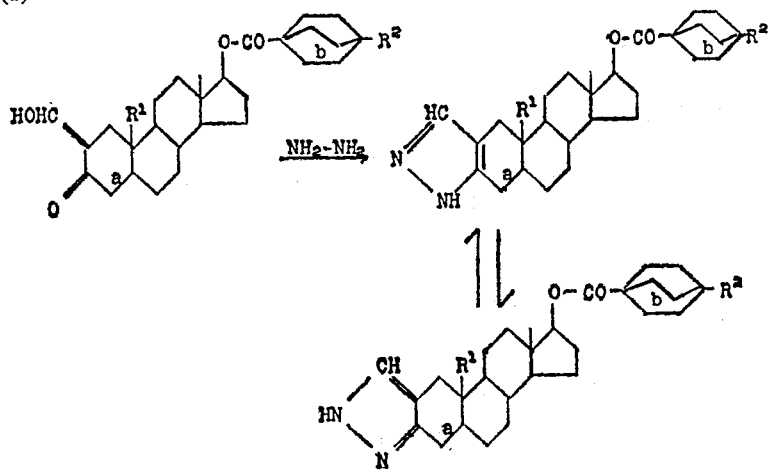

(II)

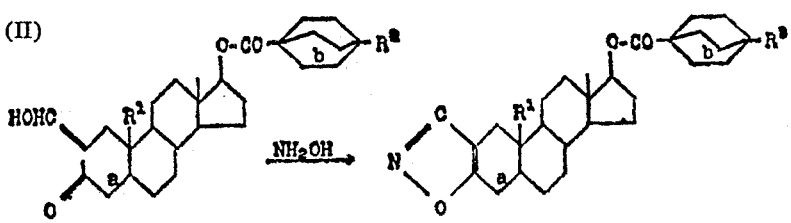

The 17β-acyloxy-2-(hydroxymethylene)androstane-3 ones that are the starting materials in Equations I and II are prepared by reacting the corresponding 17β-acyloxyandrostane-3-one with ethyl formate and sodium hydride, in accordance with the equation:

(III)

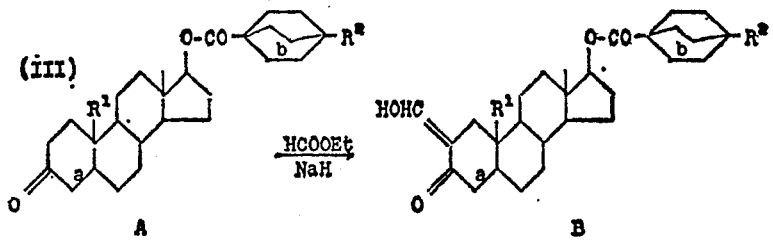

Both the starting materials (A) and the final products (B) of Equation III are described in application Ser. No. 579,515, filed by R. M. Scribner on Sept. 15, 1966 and assigned to applicant's assignee. The preparation of representative members of both classes of compounds will be described in detail further on.

DESCRIPTION OF THE PREFERRED EMBODIMENTS

The reaction conditions for the reactions represented by Equations 3 and 4 are essentially the same in both cases. The reactant proportions are not critical, but the hydrazine or hydroxylamine are preferably used in at least equimolar ratio relative to the steroid reactant, and advantageously in excess thereover, e.g., in a mole ratio between 1.25:1 and 3:1. The hydrazine and hydroxylamine can be used as such, but they are preferably used as the hydrate and hydrochloride, respectively, these derivatives being easier to handle and having good solubility in organic solvents. The reaction with hydrazine hydrate is carried out in an inert, neutral organic liquid medium capable of dissolving the reactants. Alkanols such as methanol, ethanol, isopropyl alcohol or butyl alcohol are especially suitable for this purpose, but other solvents such as ethers or ether-alcohols, e.g.; tetrahydrofuran, dioxane, methoxyethanol or 1,2-dimethoxyethane can be used. The reaction with hydroxylamine hydrochloride can be carried out in the same solvents but, since good yields are obtained under acidic conditions, it can also be carried out in a liquid carboxylic acid such as acetic acid. Both reactions proceed at a practical rate at temperatures above about 50° C. It is unnecesary to exceed about 150° C., and the temperature range between 60 and 125° C. is preferred. Pressure is not critical. The reaction product is isolated by conventional methods of precipitation and crystallization, and may be purified by chromatographic methods if desired.

The following Examples A–D describe the preparation of starting materials from which the products of the invention are obtained.

Example A

17β-hydroxy-5α-androstane-3-one 4'-methylbicyclo-[2.2.2]oct-2'-ene-1'-carboxylate (1) A mixture of 25 g. of 4-methylbicyclo[2.2.2]oct-2-ene-1-carboxylic acid, 35 ml. of thionyl chloride, and one drop of dimethylformamide was heated at reflux temperature for 2 hours. Fractional distillation of the reaction mixture gave 18.2 g. of 4-methylbicyclo[2.2.2]-oct-2-ene-1-carboxylic acid chloride, B.P. 74° C./1.5 mm.

(2) A solution of 14.6 g. of androstanolone (dihydrotestosterone) in 350 ml. of benzene was distilled until 50 ml. of solvent had been removed. To the dry solution of steroid in benzene was added 10.0 g. of 4-methylbicyclo[2.2.2]oct-2-ene-1-carboxylic acid chloride and 8.0 ml. of pyridine and the mixture was heated at reflux temperature for 24 hours. The reaction mixture was cooled and washed successively with water, 5% aqueous sodium hydroxide, water and saturated aqueous sodium chloride solution. Evaporation of the benzene under reduced pressure gave 21 g. of crude ester. Crystallization from acetone-hexane gave 17.9 g. of purified 17β-hydroxy-5α-androstane-3-one 4'-methylbicyclo[2.2.2]oct-2'-ene-1'-carboxylate, M.P. 224–228° C., showing in the ultraviolet $$\lambda_{max.}^{EtOH} \ 233 \ m\mu \ (\epsilon = 79)$$

*Analysis.*—Calcd. for $C_{29}H_{42}O_3$: C, 79.40; H, 9.65. Found: C, 79.29; H, 9.42.

Applying the same procedure to other acid chlorides of the same type and 5α-dihydrotestosterone or 5α-dihydro-19-nortestosterone, other esters of these steroids are obtained, such as, for example those in which the 17β-acyloxy group is bicyclo[2.2.2]octane-1-carbonyloxy, bicyclo[2.2.2]oct-2 - ene - 1 - carbonyloxy, 4 - ethylbicyclo-[2.2.2]octane-1-carbonyloxy, and 4-hexylbicyclo[2.2.2]-oct-2-ene-1-carbonyloxy.

Example B

17β-hydroxy-4-androstene-3-one bicyclo[2.2.2]octane-1'-carboxylate (1) Bicyclo[2.2.2]octane-1-carboxylic acid (25 g.) was reacted with thionyl chloride (35 ml.) as in Example A–1 to give 23.6 g. of bicyclo[2.2.2]octane-1- carboxylic acid chloride, B.P. 78° C./3.5 mm.

(2) Testosterone (21.6 g.) was reacted with bicyclo-[2.2.2]octane-1-carboxylic acid chloride (13.4 g.) essentially as described in Example A–2. There was obtained 20 g. of 17β-hydroxy-4-androstene-3-one bicyclo-[2.2.2]octane-1'-carboxylate, M.P. 190–192° C. after recrystallization from acetone-hexane.

*Analysis.*—Calcd. for $C_{28}H_{40}O_3$: C, 79.20; H, 9.50. Found: C, 79.41; H, 9.69.

Applying the same procedure to other acid chlorides of the same type and testosterone or 19-nortestosterone, other esters of these steroids are obtained, for example those in which the 17β-acyloxy group is bicyclo[2.2.2]oct-2-ene-1-carbonyloxy, 4 - methylbicyclo[2.2.2.]octane - 1-carbonyloxy, 4-propylbicyclo[2.2.2]oct-2-ene-1-carbonyloxy, 4 - butylbicyclo[2.2.2]octane - 1 - carbonyloxy and 4-pentylbicyclo[2.2.2]oct-2-ene-1-carbonyloxy.

The bicyclo[2.2.2]octane-1-carboxylic acids and bicyclo[2.2.2]oct-2-ene-1-carboxylic acids used for Examples A and B, or alkyl esters of either, can be prepared as described by Roberts, Moreland & Frazer in J. Am. Chem. Soc. 75, 637 (1953); Holtz & Stock in J. Am. Chem. Soc. 86, 5183, 5188 (1964); Kauer, Benson & Parshall in J. Org. Chem. 30, 1431 (1965); Grob, Ohta, Renk & Weiss in Helv. Chim. Acta 41, 1191 (1958); and in the copending patent application of J. C. Kauer, Ser. No. 460,820, filed June 2, 1965. The esters obtained in these procedures can be converted to the corresponding acids by hydrolysis using acid or basic catalysts. The acids are converted to the acid chlorides by conventional methods.

A representative preparation of, for example, 4-methylbicyclo[2.2.2]oct-2-ene-1-carboxylic acid is as follows:

A charge of 53 g. of ethyl 6-methyl-α-pyrone-3-carboxylate [J. Gen. Chem., USSR 28, 1562, 2438 (1958)], 1 g. of hydroquinone, and 80 ml. of benzene is heated in a pressure vessel with ethylene at 3000 atmospheres at a maximum temperature of 180° C. for approximately 10 hours. The pressure vessel is cooled, the gaseous contents carefully vented, benzene removed, and the liquid product distilled to give ethyl 4-methylbicyclo[2.2.2]oct-2-ene-1-carboxylate, B.P. 82° C./3.8 mm., $n_D^{25}$ 1.4662. Refluxing with methanolic sodium hydroxide followed by acidification gives 4-methylbicyclo[2.2.2]oct-2-ene-1-carboxylic acid.

EXAMPLE C

17β-hydroxy-2-hydroxymethylene-5α-androstane-3-one 4'-methylbicyclo[2.2.2]oct-2-ene-1'-carboxylate A mixture of 6.09 g. of 17β-hydroxy-5α-androstane-3-one 4'-methylbicyclo[2.2.2]oct-2'-ene-1'-carboxylate, 10 ml. of freshly distilled ethyl formate and about 3.5 g. of sodium hydride in 150 ml. of dry benzene was stirred mechanically under an atmosphere of nitrogen for 5 days at room temperature. The reaction mixture was filtered through sintered glass under nitrogen and the filter cake was washed with benzene. The benzene-moist filter cake was then added cautiously with stirring to a solution of 40 ml. of concentrated hydrochloric acid in 800 ml. of water. After about 0.5 hour, the grey precipitate was taken up in 350 ml. of methylene chloride. This solution was dried quickly over magnesium sulfate and evaporated, giving a resinous solid which, on air-drying, turned into a light yellow powder (6.0 g.). Reprecipitation from methylene chloride-acetone gave 4.7 g. of 17β-hydroxy-2-hydroxymethylene-5α-androstane-3-one 4'-methylbicyclo-[2.2.2]oct-2'-ene-1'-carboxylate, M.P. 248–249° C. The same product, as obtained in another preparation, showed in the ultraviolet $$\lambda_{max.}^{EtOH} \ 281 \ m\mu \ (\epsilon = 8,900)$$

and, with sodium hydroxide added, $$\lambda_{max.}^{EtOH} \ 315 \ m\mu \ (\epsilon = 16,200)$$

In the infrared, it showed $$\lambda_{max.}^{KBr} \ 3.4, \ 5.78 \ \text{and} \ 6.40\mu$$

*Analysis.*—Calcd. for $C_{30}H_{42}O_4$: C, 77.21; H, 9.07. Found: C, 77.31; H, 9.18.

Applying the same procedure to other esters of Example A, there are obtained other esters of 2-hydroxymethylene-5α-dihydrotestosterone and 2-hydroxymethylene-5α-dihydro-19-nortestosterone in which the 17β-acyloxy group is, for example, bicyclo[2.2.2]octane-1-carbonyloxy, bicyclo-[2.2.2]oct-2-ene-1-carbonyloxy, 4-ethylbicyclo[2.2.2]octane-1-carbonyloxy, and 4-hexylbicyclo[2.2.2]oct-2-ene-1-carbonyloxy.

EXAMPLE D

17β-hydroxy-2-hydroxymethylene-4-androstene-3-one bicyclo[2.2.2]octane-1-carboxylate Using essentially the procedure described in Example C, 10 g. of 17β-hydroxy-4-androstene-3-one bicyclo-[2.2.2]octane-1'-carboxylate was converted to 6.67 g. of 17β - hydroxy-2-hydroxymethylene-4-androstene - 3 - one bicyclo-[2.2.2]octane - 1' - carboxylate. This compound showed in the ultraviolet $$\lambda_{max.}^{EtOH} \ 205, \ 304 \ m\mu$$

Applying the same procedure to other esters of Example B, there are obtained other esters of 2-hydroxymethylenetestosterone and 2-hydroxymethylene-19-nortestosterone in which the 17β-acyloxy group is, for example, bicyclo[2.2.2]oct-2-ene-1-carbonyloxy, 4-methylbicyclo-[2.2.2]octane - 1 - carbonyloxy, 4-propylbicyclo-[2.2.2]oct-2-ene-1-carbonyloxy, 4 - butylbicyclo[2.2.2] octane-1-carbonyloxy and 4-pentylbicyclo[2.2.2]oct-2-ene-1-carbonyloxy.

The following examples describe some of the products of this invention and their preparation.

EXAMPLE 1

17β-hydroxy-5α-androstano[3,2-c]pyrazole 4'-methylbicyclo-[2.2.2]oct-2'-ene-1'-carboxylate A mixture of 2.33 g. of 17β-hydroxy-2-hydroxymethylene-5α-androstane-3-one 4' - methylbicyclo[2.2.2]oct-2'-ene-1'-carboxylate and 50 ml. of absolute ethanol was heated just below the boiling point while 0.358 g. of hydrazine hydrate was added dropwise. The mixture was heated at reflux temperature for 4.5 hours, during which time the 2-hydroxymethylene steroid dissolved and crystalline steroido pyrazole precipitated. After 2.5 hours of reflux time, an additional 25 ml. of absolute ethanol was added. At the conclusion of the reflux period, the reaction mixture was cooled in ice and the crystalline steroido pyrazole which separated was collected by filtration (1.8 g.). This product was recrystallized twice from ethanol to give 0.89 g. of 17β-hydroxy-5α-androstano[3,2-c]pyrazole 4′-methylbicyclo-[2.2.2]oct-2′-ene-1′-carboxylate, M.P. 298–301° C., $[\alpha]_D^{24}+54°$ (c. 1.0, CHCl$_3$) showing in the ultraviolet

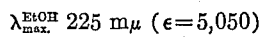
$\lambda_{max.}^{EtOH}$ 225 mμ (ε=5,050)

and in the infrared

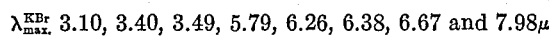
$\lambda_{max.}^{KBr}$ 3.10, 3.40, 3.49, 5.79, 6.26, 6.38, 6.67 and 7.98μ

*Analysis.*—Calcd. for C$_{30}$H$_{42}$N$_2$O$_2$: C, 77.88; H, 9.15; N, 6.06. Found: C, 78.07; H, 8.98; N, 6.38.

Other representative compounds of the invention, either in the androstane or in the 19-norandrostane series, that can be prepared by the described procedure from the appropriate 17β-acyloxy-2-hydroxymethylene-3-keto steroids include:

17β-hydroxy-5α-androstano[3,2-c]pyrazole bicyclo-[2.2.2]octane-1′-carboxylate;

17β-hydroxy5α-androstano[3,2-c]pyrazole 4′-methylbicyclo[2.2.2]octane-1′-carboxylate;

17β-hydroxy-5α-19-norandrostano[3,2-c]pyrazole 4′-ethylbicyclo[2.2.2]oct-2′-ene-1-carboxylate;

17β-hydroxy-5α-norandrostano[3,2-c]pyrazole 4′-hexylbicyclo[2.2.2]octane-1′-carboxylate.

EXAMPLE 2

17β-hydroxy-5α-androstano[2,3-d]isoxazole 4′-methylbicyclo[2.2.2]oct-2′-ene-1′-carboxylate To a mixture of 2.33 g. of 17β-hydroxy-2-hydroxymethylene-5α-androstane-3-one 4′ - methylbicyclo[2.2.2]oct-2′-ene-1′-carboxylate and 100 ml. of hot ethanol was added a solution of 0.49 g. of hydroxylamine hydrochloride in 0.5 ml. of water. After the reaction mixture had been heated at reflux temperature for about 0.5 hour, an additional and equal quantity of hydroxylamine hydrochloride in water was added and the mixture was heated at reflux temperature for 1.5 hours. The solution was then cooled in ice and the precipitate of steroid isoxazole was collected by filtration (1.6 g.); M.P. 203–210° C. Recrystallization from ethanol gave 1.35 g. of purified 17β-hydroxy-5α-androstano[2,3-d]isoxazole 4′ - methylbicyclo [2.2.2]oct - 2′ - ene - 1′ - carboxylate, M.P. 207–211° C., $[\alpha]_D^{24}+54°$ (c. 1.1, CHCl$_3$). This compound showed in the ultraviolet $\lambda_{max.}^{EtOH}$ 227 and 278 mμ (ε=4,840 and 43)

and in the infrared $\lambda_{max.}^{KBr}$ 3.30, 3.40, 3.49, 5.79, 6.09, and 7.98μ

*Analysis.*—Calcd. for C$_{30}$H$_{41}$NO$_3$: C, 77.71; H, 8.91; N, 3.07. Found: C, 77.69; H, 8.74; N, 3.25.

Other examples of isoxazole derivatives that can be obtained by the same procedure from the appropriate 17β-acyloxy-2-hydroxymethylene-3-ketoandrostane or 19-norandrostane are:

17β - hydroxy - 5α - androstano[2,3-d]isoxazole bicyclo-[2.2.2]oct-2′-ene-1′-carboxylate;

17β - hydroxy - 5α - androstano[2,3-d]isoxazole bicyclo-[2.2.2]octane-1′-carboxylate;

17β - hydroxy - 5α - androstano[2,3-d]isoxazole 4′ - butylbicyclo[2.2.2]oct-2′-ene-1′-carboxylate;

17β - hydroxy - 5α - 19 - norandrostano[2,3-d]isoxazole 4′-methylbicyclo[2.2.2]octane-1′-carboxylate;

17β - hydroxy - 5α - 19 - norandrostano[2,3-d]isoxazole 4′-ethylbicyclo[2.2.2]oct-2′-ene-1′-carboxylate.

EXAMPLE 3

17β-hydroxy-4-androsteno[3,2-c]pyrazole bicyclo [2.2.2]octane-1′-carboxylate

By a procedure analogous to that of Example 1, 3.34 g. of 17β-hydroxy-2-hydroxymethylene-4-androstene-3-one bicyclo[2.2.2]octane-1′-carboxylate was reacted with 0.50 g. of hydrazine hydrate to give 3.5 g. of steroido pyrazole reaction product. Chromatography of the crude product on a magnesium silicate absorbent, eluting with hexane containing 8% of acetone, gave pure 17β-hydroxy-4-androsteno[3,2-c]pyrazole bicyclo[2.2.2]octane-1′-carboxylate, M.P. 267–272° C. after recrystallization from acetone-methylene chloride, $[\alpha]_D^{24}+102°$ (c. 1.2, CHCl$_3$). The product showed in the ultraviolet

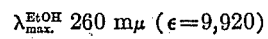
$\lambda_{max.}^{EtOH}$ 260 mμ (ε=9,920)

and in the infrared

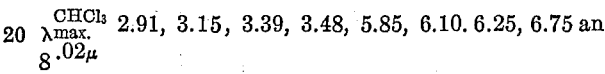
$\lambda_{max.}^{CHCl_3}$ 2.91, 3.15, 3.39, 3.48, 5.85, 6.10. 6.25, 6.75 and 8.02μ

*Analysis.*—Calcd. for C$_{29}$H$_{40}$N$_2$O$_2$: C, 77.63; H, 8.99; N, 6.29. Found: C, 77.53; H, 8.69; N, 6.40.

Other steroido pyrazoles of this invention that can be prepared by the same procedure from other esters of 2-hydroxymethylenetestosterone or 19-nortestosterone are, for example:

17β - hydroxy - 4 - androsteno[3,2-c]pyrazole bicyclo-[2.2.2]oct-2′-ene-1′-carboxylate;

17β - hydroxy - 4 - androsteno[3,2-c]pyrazole 4′ - methylbicyclo[2.2.2]octane-1′-carboxylate;

17β - hydroxy - 4 - androsteno[3,2-c]pyrazole 4′ - propylbicyclo[2.2.2]octane-1′-carboxylate;

17β - hydroxy - 19 - nor - 4 - androsteno[3,2-c]pyrazole 4′ - methylbicyclo[2.2.2]oct - 2′ - ene - 1′ - carboxylate; and 17β - hydroxy - 19 - nor - 4 - androsteno[3,2-c]pyrazole 4′-pentylbicyclo[2.2.2]octane-1′-carboxylate.

EXAMPLE 4

17β-hydroxy-4-androsteno[2,3-d]isoxazole bicyclo [2.2.2]octane-1′-carboxylate

By a procedure analogous to that of Example 2, 3.34 g. of 17β - hydroxy - 2 - hydroxymethylene - 4 - androstene-3-one bicyclo[2.2.2]octane-1′-carboxylate was reacted with a total of 0.57 g. of hydroxylamine hydrochloride. Chromatography of the crude steroido isoxazole on neutral alumina (activity III), eluting with 1:1 petroleum ether-benzene, gave after two crystallizations from acetone-hexane 1.1 g. of 17β-hydroxy-4-androsteno[2,3-d] isoxazole bicyclo[2.2.2]octane-1′-carboxylate, M.P. 210–217° C., $[\alpha]_D^{24}+102°$ (c. 1.1, CHCl$_3$). This compound showed in the ultraviolet $\lambda_{max.}^{EtOH}$ 2.85 mμ (ε=11,100)

and in the infrared $\lambda_{max.}^{CHCl_3}$ 3.40, 3.48, 5.85, 6.14, 6.24 and 8.02μ

*Analysis.*—Calcd. for C$_{29}$H$_{39}$NO$_3$: C, 77.46; H, 8.74; N, 3.12. Found: C, 77.61, H, 8.57; N, 3.13.

Using the same procedure, other steroido isoxazoles can be prepared from other suitable esters of 2-hydroxymethylenetestosterone or 19-nortestosterone, for example:

17β - hydroxy - 4 - androsteno[2,3-d]isoxazole bicyclo-[2.2.2]oct-2′-ene-1′-carboxylate;

17β - hydroxy - 4 - androsteno[2,3-d]isoxazole 4′ - methylbicyclo[2.2.2]oct-2′-ene-1′-carboxylate;

17β - hydroxy - 4 - androsteno[2,3-d]isoxazole 4′ - hexylbicyclo[2.2.2]octane-1′-carboxylate;

17β - hydroxy - 19 - nor - 4 - androsteno[2,3-d]isoxazole 4′-methylbicyclo[2.2.2]octane-1′-carboxylate.

The compounds of this invention are potent anabolic agents. They display a surprisingly high ratio of myotrophic to androgenic activities as compared to the corresponding 17β - hydroxyandrostano[3,2-c]pyrazoles or [2,3-d]isoxazoles or to the esters of these steroid alcohols with conventional carboxylic acids. When the esters of this invention are administered to rats, the above-mentioned favorable ratio of activities is manifested by remarkable hypertrophy of the muscle levator ani, accompanied by a relatively small response of the ventral prostate and seminal vesicles. Furthermore, the myotrophic response to these esters is of considerably longer duration than the response to the corresponding 17β-hydroxyandrostano[3,2-c]pyrazoles and [2,3-d]isoxazoles or their esters with conventional carboxylic acids. This high therapeutic ratio and prolonged activity makes the esters of this invention of outstanding value as anabolic agents. In addition, these esters are useful as long-acting antigonadrotrophic agents.

The embodiments of the invention in which an exclusive property or privilege is claimed are defined as follows:

1. A composition of matter selected from the formulas

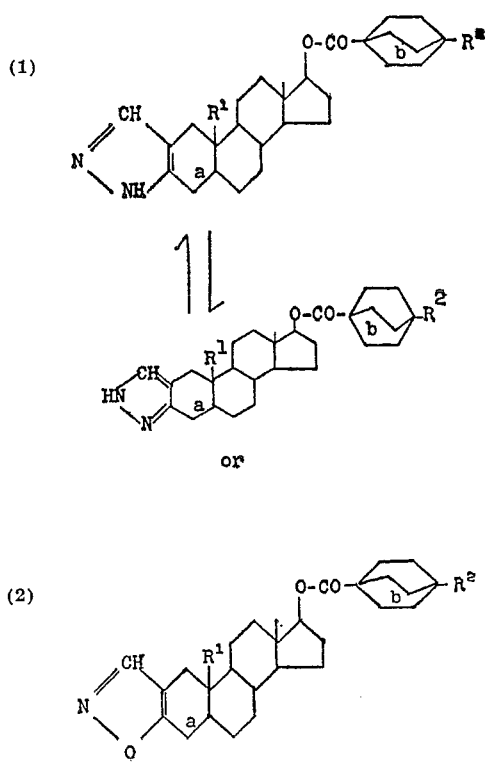

where
R¹ is hydrogen or methyl,
R² is hydrogen or n-alkyl of 1 to 6 carbon atoms,
a and b each are double or single bonds, and when a is a single bond, the steroid C-5 hydrogen is of the α configuration.

2. The composition of matter of claim 1 having the formula

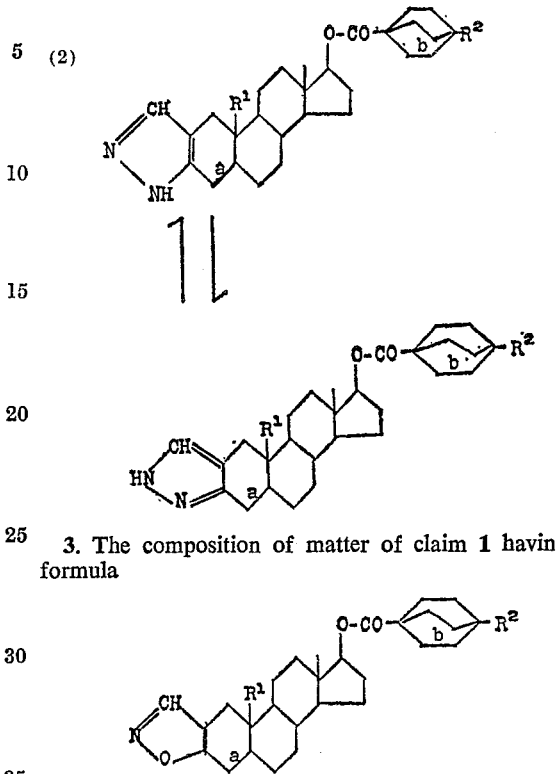

3. The composition of matter of claim 1 having the formula $$\text{(structure)}$$

where
R¹ is hydrogen or methyl
R² is hydrogen or n-alkyl of 1 to 6 carbon atoms
a and b each are double or single bonds, and when a is a single bond, the steroid C-5 hydrogen is the α configuration.

4. 17β-hydroxy - 5α - androstano[3,2-c]pyrazole 4'-methylbicyclo[2.2.2]oct-2'-ene-1'-carboxylate.

5. 17β - hydroxy - 5α - androstano[2,3-d]isoxazole 4'-methylbicyclo[2.2.2]oct-2'-ene-1'-carboxylate.

6. 17β - hydroxy - 4 - androsteno[3,2-c]pyrazole bicyclo[2.2.2]octane-1'-carboxylate.

7. 17β - hydroxy - 4 - androsteno[2,3-d]isoxazole bicyclo[2.2.2]-octane-1'-carboxylate.

References Cited

UNITED STATES PATENTS 3,135,743   6/1964   Clinton et al. _____ 260—239.55

FOREIGN PATENTS 911,814   11/1962   Great Britain.

ELBERT L. ROBERTS, Primary Examiner

U.S. Cl. X.R.

260—239.55, 999